INVENTOR.
ALAN F. SHUGART
BY John B. Clark
ATTORNEY

May 19, 1964 A. F. SHUGART 3,134,091

MEANS TO READ OUT LESS THAN ALL BITS IN A REGISTER

Filed July 2, 1957 11 Sheets-Sheet 3

United States Patent Office 3,134,091

Patented May 19, 1964

3,134,091

MEANS TO READ OUT LESS THAN ALL BITS IN A REGISTER

Alan F. Shugart, Santa Clara County, Calif., assignor to International Business Machines Corporation, New York, N.Y., a corporation of New York Filed July 2, 1957, Ser. No. 669,628
7 Claims. (Cl. 340—172.5)

Figure 1:
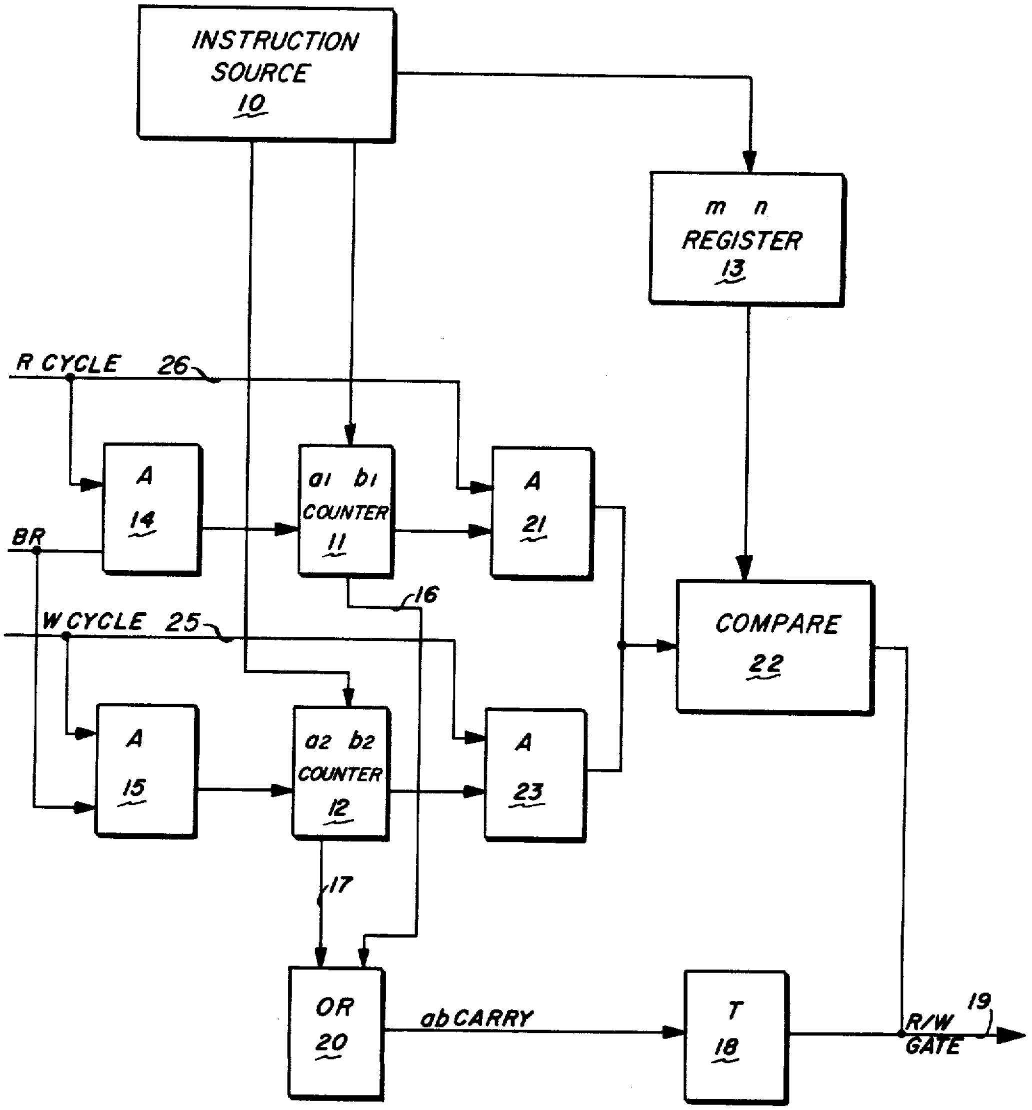

The present invention pertains generally to data transfer apparatus and relates more particularly to circuits for controlling data transfer operations.

Transfer operations involving data to be read from or recorded in selected storage positions may be controlled by gating apparatus wherein data from storage is mixed with a gating signal for permitting passage of only the data determined by the gating signal. For example, a magnetic drum track or a magnetic core storage or the like may contain storage locations for a number of characters which are read therefrom or recorded therein serially, and data may be read from or recorded in selected storage positions under control of a gating signal which is timed according to the selected storage positions.

In the present embodiment of the invention a gate generation circuit for controlling data transfer is provided for operating under control of an instruction wherein the initial character position, together with the number of character positions involved in the operation, is specified. According to the described embodiment, a counting circuit and a register are provided which are preset according to the initial character position involved and the number of character positions involved, respectively, as determined by the instruction. As the character positions are scanned, the counter is advanced, and when the counter carries, the transfer gate is initiated. The condition of the counter is thereafter compared with the condition of the register and a comparison therebetween terminates the transfer gate.

Thus, the object of the present invention is to provide an improved circuit for controlling data transfer operations.

Other objects of the invention will be pointed out in the following description and claims and illustrated in the accompanying drawings, which disclose, by way of example, the principle of the invention and the best mode which has been contemplated of applying that principle.

In the drawings:

FIG. 1 is a logic diagram of the disclosed embodiment of the invention.

FIGS. 2 through 9 comprise detailed circuit diagrams of the structure shown in FIG. 1.

FIGS. 10 through 22 comprise schematic diagrams of the various electronic components shown in block form in FIGS. 2 through 9.

Figure 23:
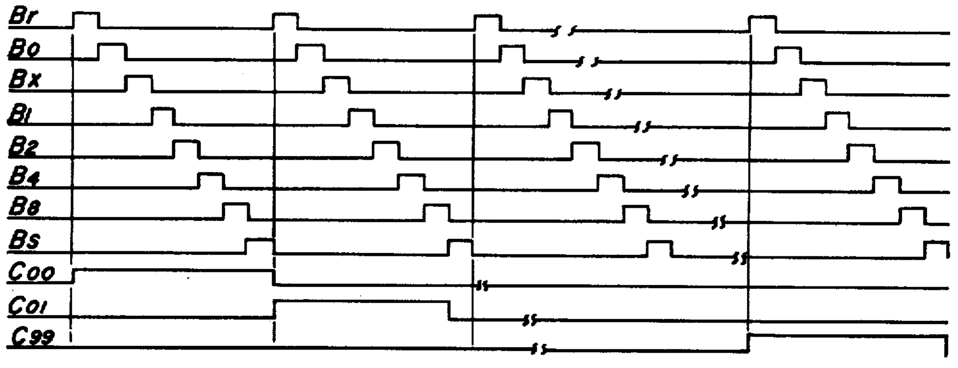

FIG. 23 is a diagram showing the timing of the various electronic signals utilized herein.

Referring now to FIG. 1, a source of instructions 10 is provided for controlling the condition of an $a_1b_1$ counter 11, of an $a_2b_2$ counter 12 and of an $mn$ register 13 prior to the data transfer operations associated with a given instruction. A suitable instruction may be in the form of $T_1a_1b_1T_2a_2b_2mn$ wherein the $T_1$ and $T_2$ portions of the instruction designate the source and destination storage media involved in the operation. The $a_1b_1$ portion of the instruction designates the first position in the source medium from which data is to be taken, and the $a_2b_2$ portion designates the first storage position in the destination medium to which the data is to be transferred. The $mn$ portion of the instruction denotes the number of character storage positions involved in the data transfer operation.

Selection of the storage media according to the $T_1$ and $T_2$ portions of the instruction forms no part of the present invention and it will be assumed that conventional means have been provided for this purpose. Further, to simplify an understanding of the present invention it will be assumed that storage media such as drum tracks having storage capacity for 100 characters are utilized. Accordingly the $a_1b_1$ and $a_2b_2$ counters 11 and 12 are arranged to count from 00 through 99 and the $mn$ register 13 is arranged to indicate the number of character positions involved in the operation, up to a maximum of 100, according to the $mn$ portion of the instruction. To facilitate further an understanding of the invention, machine cycles are designated. To this end it will be assumed that instructions are supplied during an instruction or I cycle, that data is read from the $T_1$ address during a read of R cycle, and that this data is recorded at the $T_2$ address during a write or W cycle, the data read from the $T_1$ address during the R cycle being entered into a buffer storage or the like during this cycle and read therefrom during the next following W cycle.

The various character storage positions on the drum track are labeled 00 through 99, the transducer being arranged to scan these positions in that order. An 8-bit code is utilized, each character position having provision for eight bits labeled $B_r$, $B_o$, $B_x$, $B_1$, $B_2$, $B_4$, $B_8$ and $B_s$, which occur in that order (see FIG. 23). The counters 11 and 12 are arranged to count from 00 through 99 and these counters are preset during the instruction cycle according to the 99's complement of the $ab$ portions of the instruction. Similarly, the $mn$ register 13 is preset during the instruction cycle according to the $mn$ portion of the instruction. For convenience, it will be assumed that the counters 11 and 12 are driven by $B_r$ signals developed in any convenient manner, which occur at the beginning of each character time. During the R cycle $B_r$ pulses are mixed in an "and" unit 14, the output of which drives the $a_1b_1$ counter 11. During the W cycle, however, $B_r$ pulses are mixed in an "and" unit 15 and the output of this unit drives the $a_2b_2$ counter 12. When either the $a_1b_1$ or $a_2b_2$ counter carries from 99 to 00, a corresponding carry line 16 or 17, respectively, rises. These lines are connected through an "or" circuit for operating the gate generating trigger 18 for rendering a line referred to as the "R/W gate" line 19 high. Thus, when either of the counters 11 or 12 carries, the trigger 18 is operated and the line 19 rises in potential.

The contents of the $a_1b_1$ counter 11 are mixed with R cycle signals in an "and" unit 21, the output of which comprises a first input of a compare circuit 22. Similarly, the contents of the $a_2b_2$ counter 12 are mixed with the W cycle signal in an "and" unit 23, the output of the unit 23 being connected to the first input of the compare unit 22. Thus, during the R and W cycles the contents of the corresponding counter are compared with the contents of the $mn$ register 13 since this register furnishes the second input to the unit 22. The output of the compare unit 22 connects to the other side of the trigger 18 for operating it to terminate the R/W gate when the $a_1b_1$ or $a_2b_2$ counter compares with the condition of the $mn$ register.

Assuming, for example, that it is desired to read or record five characters associated with character positions 03 through 07, the $ab$ portion of the instruction would then be 03 and the mn portion woud be 05. During the I cycle the counter 11 or 12 is set to 96, the 99's complement of 03, and the register 13 is set to indicate 05. At the beginning of each character time, commencing with character time 00, the counter 11 or 12 is advanced. When the counter is advanced from 99 to 00, as it is at the beginning of character 03 time, a carry signal is generated for initiating the R/W gate, as explained. Additionally, when the counter is advanced to 05, as it is at the beginning of 08 character time, the condition of the *mn* register compares with the condition of the counter. This comparison generates a signal which reverses the condition of the trigger 18 and terminates the R/W gate after the desired five characters have been gated.

The various electronic components utilized in the machine of the invention have been shown in FIGS. 2 through 9 merely as blocks and the blocks have been labeled to indicate the function of the component represented thereby. Before proceeding with the description of the detailed circuitry of the invention, a brief description of the circuitry defined by each of the blocks will be given. This circuitry is shown in FIGS. 10 through 22 of the drawings. Each of the letter designations shown in the blocks denotes the function of the component, and the figure number within each block acts as a reference to the detailed circuitry. It follows, therefore, that a block labeled "AK" is indicative of an "and" unit with a cathode follower output; similarly, blocks labeled "AI" are "and" units with an inverter output. It should additionally be noted that units labeled "D" are diodes, that units labeled "K" are cathode followers, that units labeled "T" are triggers, that units labeled "I" are inverters, and that units labeled "A" are "and" gates. Since each of the units represented by the various blocks and shown in FIGS. 10 through 22 is well known in the art, only a brief general description of its function is given herein.

The various I units shown in FIGS. 10, 11, 12 and 14 comprise dual inverter circuits of various configurations determined by the parameters of the circuits wherein they are used.

Figure 13:
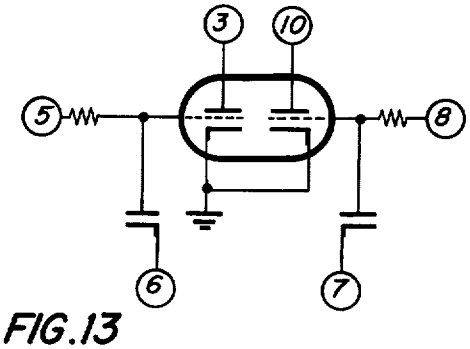
Figure 14:
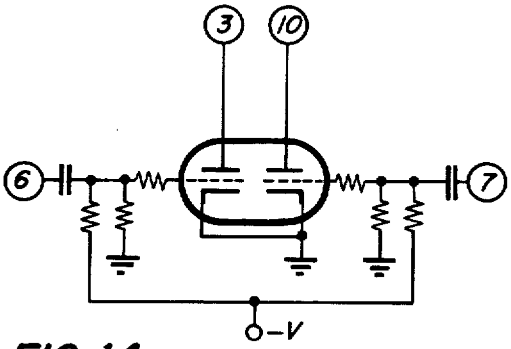
Figure 15:
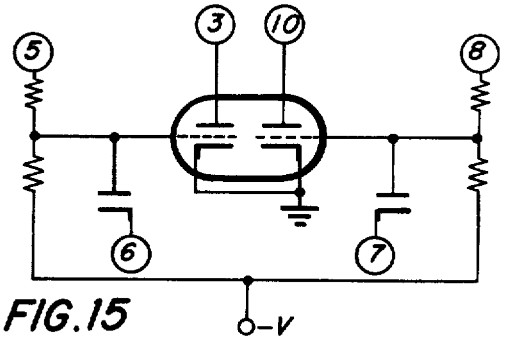

The AI units shown in FIGS. 13 and 15 comprise dual "and" gates having an inverter output. Again, the circuit configuration is determined according to the parameters of the circuits wherein it is utilized.

Figure 16:
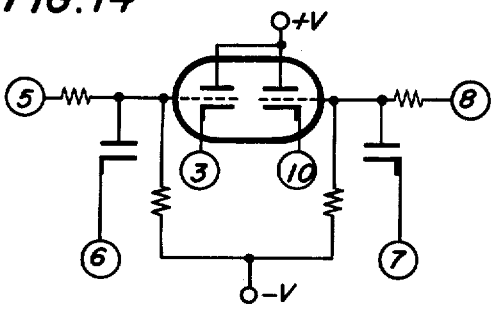
Figure 17:
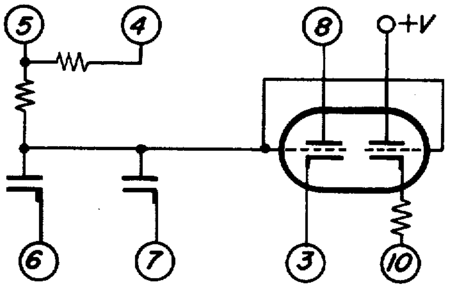

The AK units shown in FIGS. 16 and 17 comprise dual "and" gates having cathode follower outputs.

Figure 18:
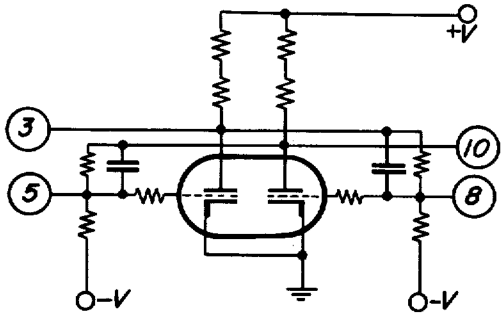
Figure 19:
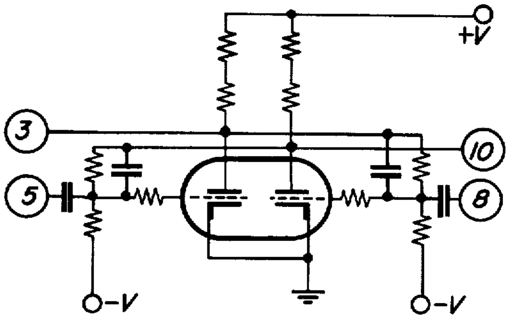
Figure 20:
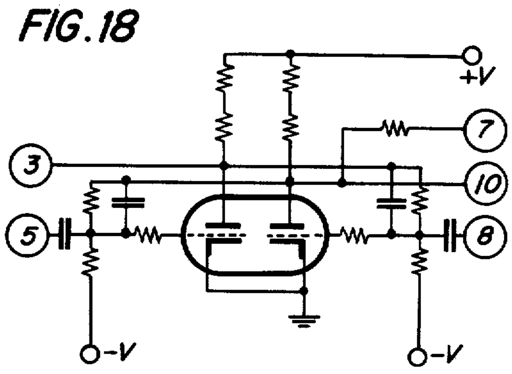

The various T units shown in FIGS. 18, 19 and 20 are trigger circuits and operate in the bistable manner commonly associated with such triggers.

Figure 21:
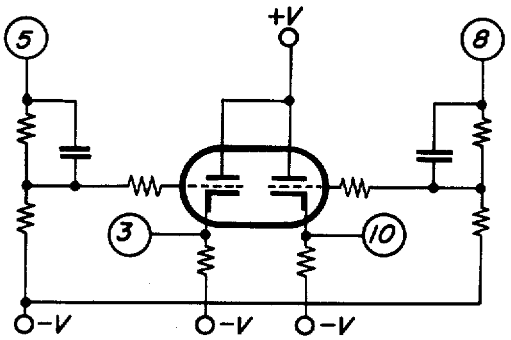
Figure 22:
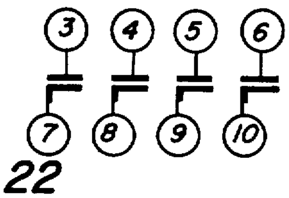

The K unit shown in FIG. 21 is a dual cathode follower unit and the D unit shown in FIG. 22 includes a plurality of diodes.

Figure 2:
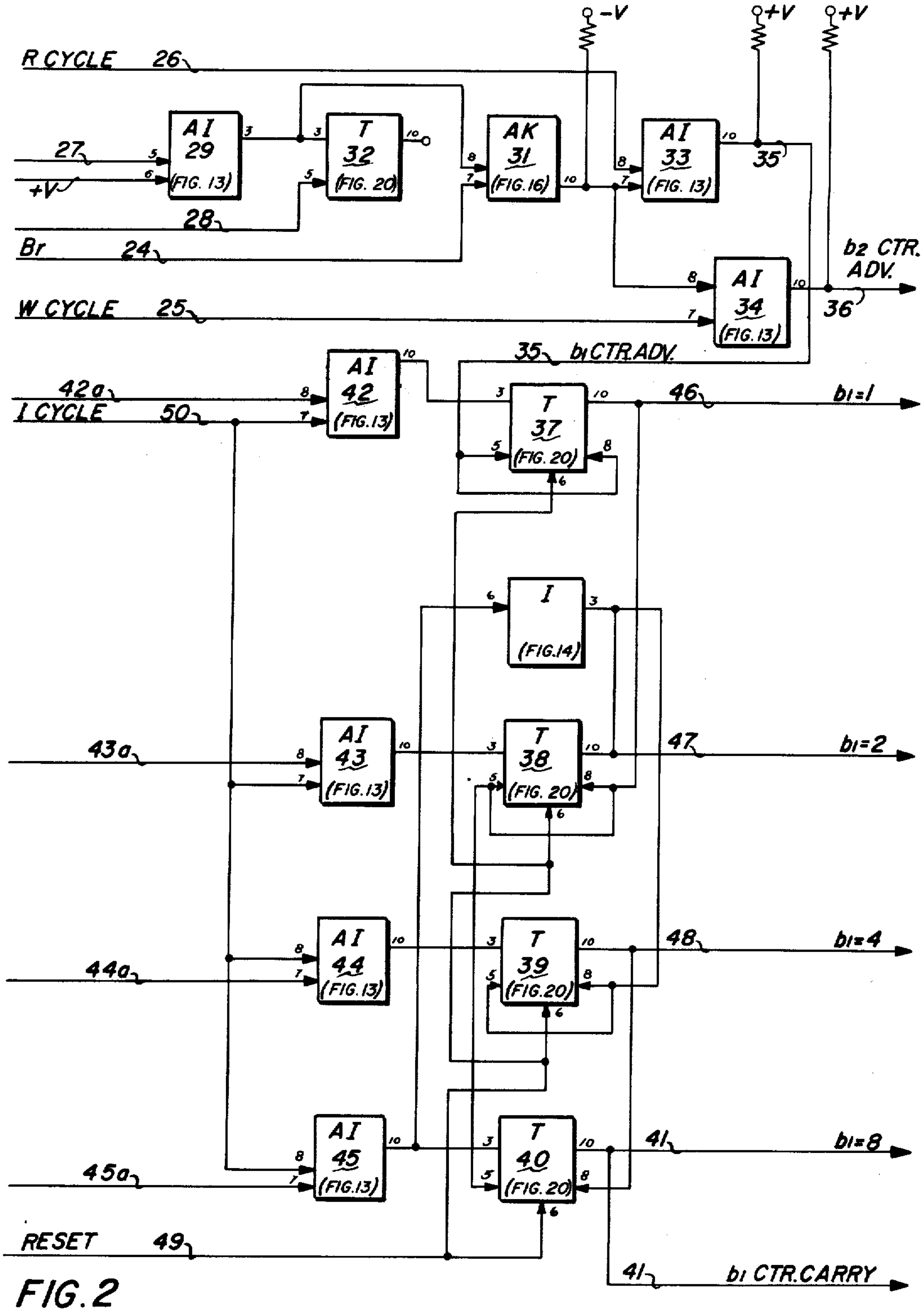

The more detailed circuitry of the present embodiment of the invention is shown in FIGS. 2 through 9. Referring to FIG. 2, $B_r$ signals, generated by a bit counter or the like along with $B_0$, $B_x$, $B_1$, $B_2$, $B_4$, $B_8$ and $B_s$ pulses (see FIG. 23), are connected via a line 24 to the #7 tap of an AK unit 31 where they are mixed with the signal taken from the #3 tap of a T unit 32. Trigger 32 is operated by a signal taken from a line 28 generated in any convenient manner to occur prior to scanning the character positions of the subject storage medium. Additionally, trigger 32 is operated at the end of each such scan. For this reason an end-of-scan signal taken from a line 27 is entered through an AI unit 29 to the #3 tap of the trigger 32. Thus, trigger 32 is reset in a condition wherein the #3 tap thereof is low at the end of each scan, and prior to the next following scan the trigger is operated to raise the potential of the #3 tap, thereby raising the potential of the #8 tap of the unit 31 for permitting passage of $B_r$ pulses to the #10 tap thereof.

The #10 tap of the unit 31 connects to the #7 tap of an AI unit 33, where the $B_r$ pulse is mixed with the R cycle signal taken from a line 26, as well as to the #8 tap of an AI unit 34 where the $B_r$ pulse is mixed with the W cycle signal taken from a line 25. The #10 tap of the AI unit 33 connects to the input of the $b_1$ counter via a line 35, the #10 tap of the AI unit 34 being connected to the input of the $b_2$ counter by a line 36, for driving these counters during the corresponding R and W cycles, respectively.

The $b_1$ counter, i.e., the units order of the $a_1b_1$ counter, comprises four triggers 37 through 40 connected as a binary-decade counter. Each of the triggers 37 through 40 is reset prior to the I cycle in such a way that the #3 tap thereof is initially high. The #6 tap of each trigger 37 through 40 connects normally to a negative bias voltage via a line 49; however, prior to the I cycle means (not shown) causes this voltage to be removed momentarily, thereby causing the potential of the #10 tap to drop and the potential of the #3 tap to rise. This $b_1$ counter circuitry is connected and operated in a conventional manner, as is obvious from the drawings, the carry being taken from the #10 tap of the trigger 40 via a line 41.

The $b_1$ portion of the instruction is entered into the $b_1$ counter during the I cycle through four AI units 42 through 45 for presetting the various triggers 37 through 40 according to the 9's complement of the $b_1$ portion of the instruction. For this purpose four instruction data lines 42*a* through 45*a* connect to these units and the signals taken therefrom are mixed with I cycle signals taken from a line 50. Additionally, the condition of the $b_1$ portion of the $a_1b_1$ counter is indicated according to the condition of four output lines 46, 47, 48 and the line 41. Since instruction generation circuits form no part of the present invention, a discussion thereof is not given herein. It is sufficient to note that any convenient means may be provided for entering the $b_1$ instruction data on the lines 42*a* through 45*a*.

The output of the $b_1$ counter is utilized to drive the $a_1$ counter, the line 41 being connected to the #5 and #8 taps of a T unit 51 (FIG. 4) which comprises one of four such T units included in the $a_1$ counter. The $a_1$ counter, like the $b_1$ counter, is conventional in its operation and a detailed description thereof is not given herein. This counter is additionally preset during the I cycle according to the condition of four lines 55*a* through 58*a* from which signals defining the $a_1$ portion of the instruction are taken. For this purpose the lines 55*a* through 58*a* connect through four AI units 55 through 58 to the corresponding trigger 51 through 54. Four output lines 59 through 62 indicate the condition of the $a_1$ counter. The carry signal from the $a_1$ counter is taken from the #3 tap of the T unit 54 via a line 63 for use in a manner to be described.

Figure 3:
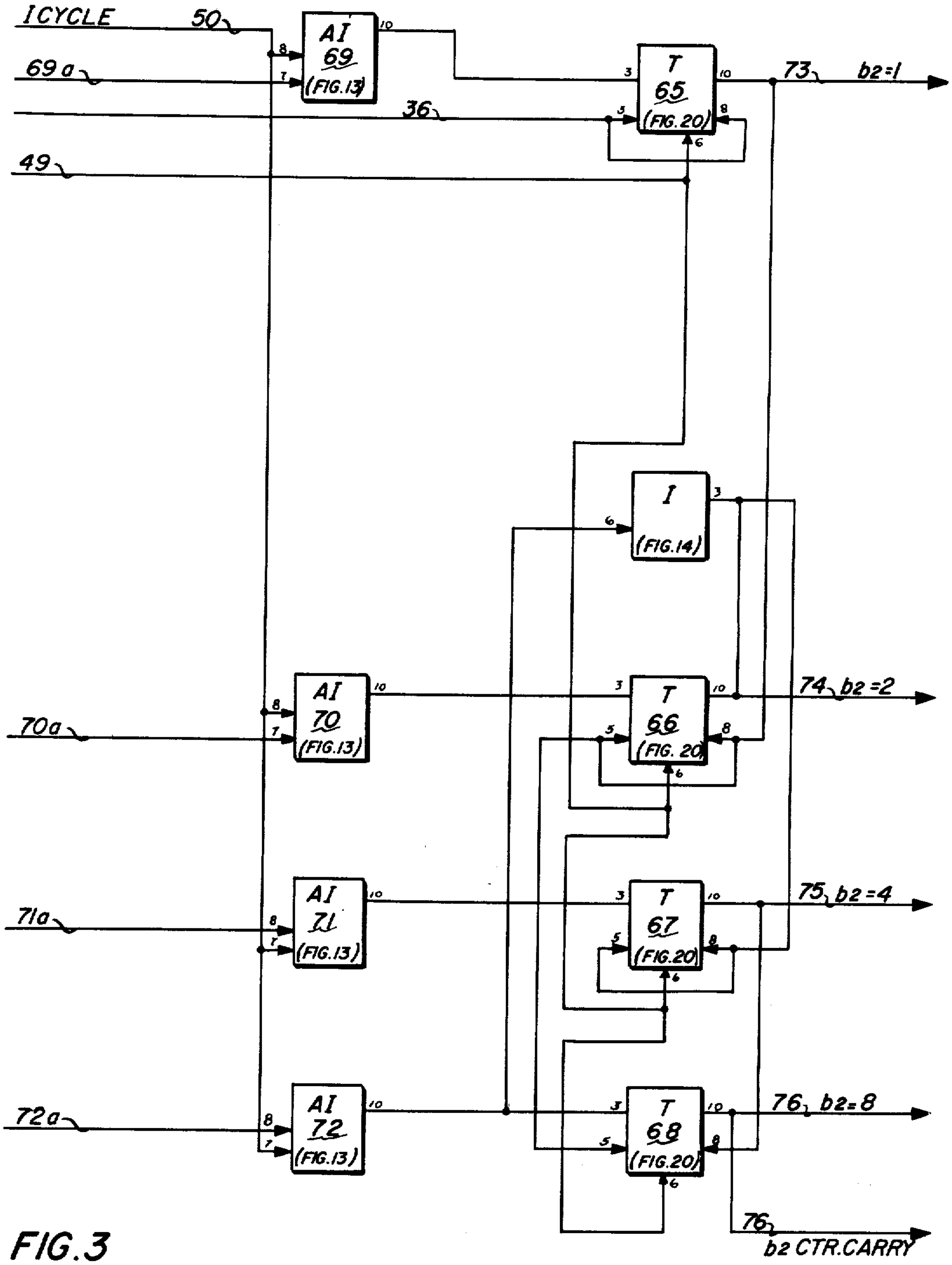
Figure 4:
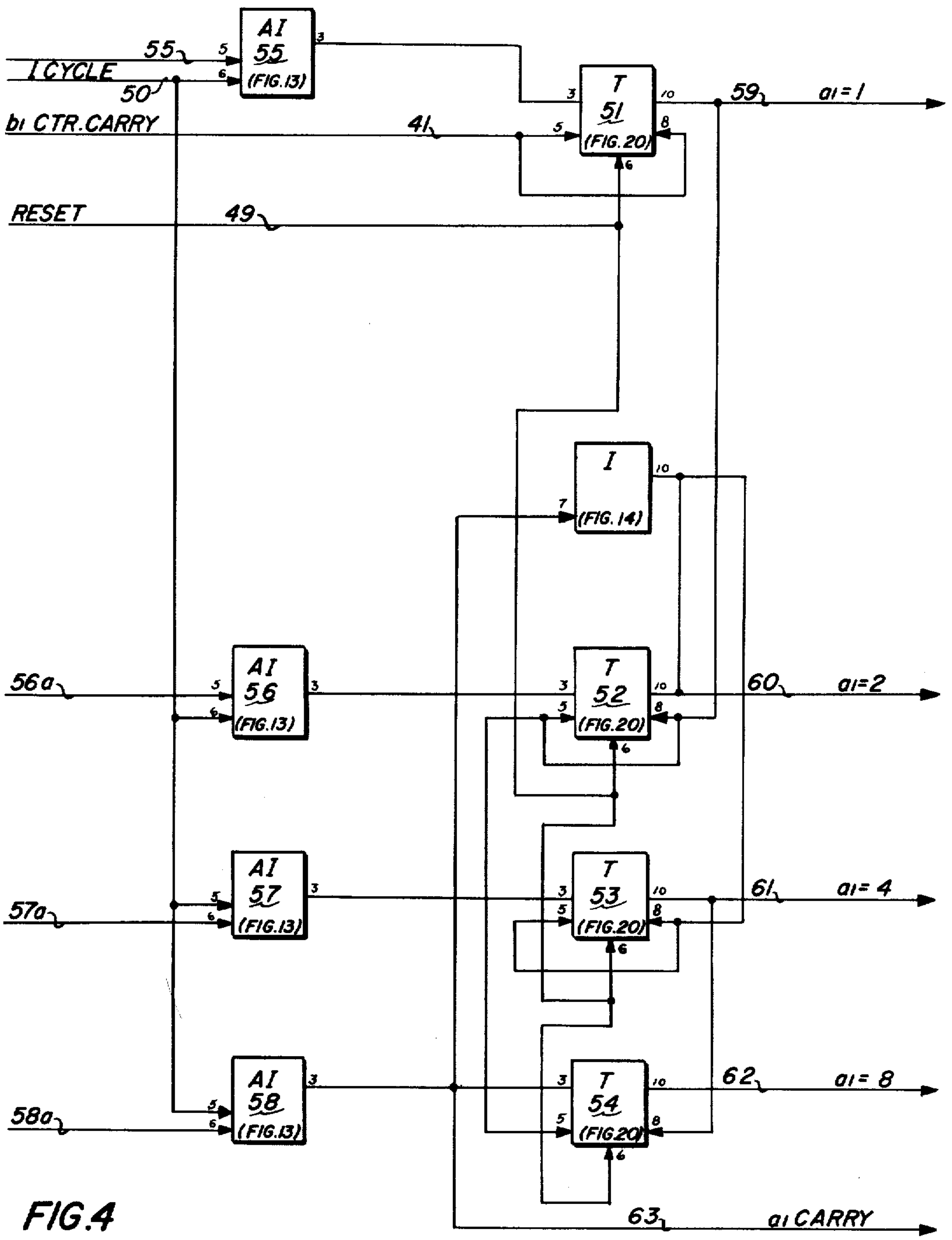
Figure 5:
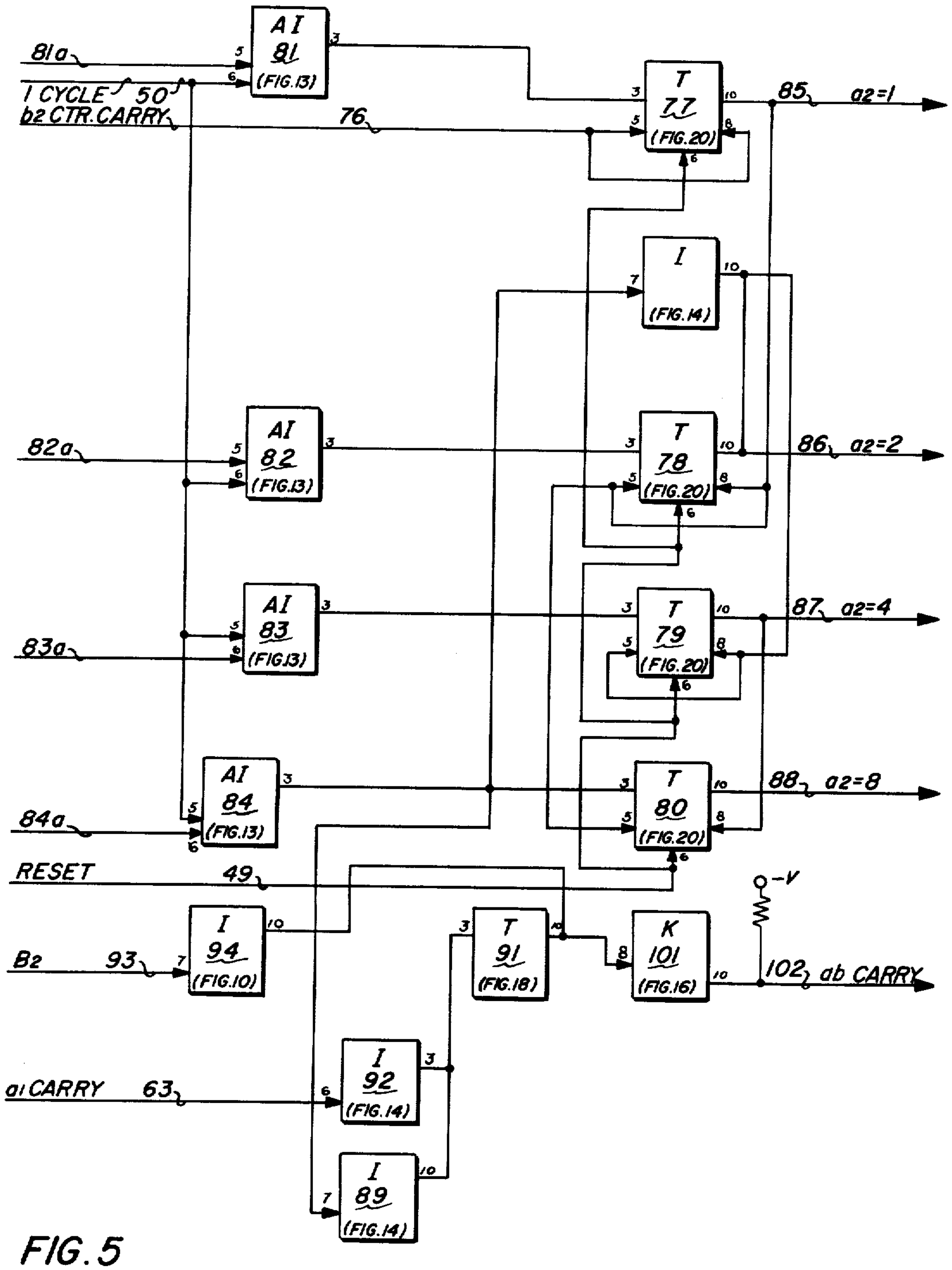

The $a_2b_2$ counter is substantially identical to the $a_1b_1$ counter, the $b_2$ portion being shown in FIG. 3 and the $a_2$ portion being shown in FIG. 5. $B_r$ pulses taken from the line 36 (FIG. 2) are connected for operating a decade counter comprising four triggers 65 through 68 (FIG. 3) which are reset in the manner described in connection with the $a_1b_1$ counter and are preset during the instruction cycle under the control of signals entered therein through four AI units 69 through 72. Additionally, the condition of the $b_2$ portion of the $a_2b_2$ counter is indicated by the potential of four lines 73 through 76. The signals taken from the line 76 are additionally utilized to drive the $a_2$ counter. The line 76 connects to the #5 and #8 taps of a T unit 77 (FIG. 5), which unit together with three T units 78 through 80 comprise the $a_2$ counter. The $a_2$ portions of instructions are entered into the triggers 77 through 80 through four AI units 81 through 84, during the I cycle, and four output lines 85 through 88 are provided for indicating the condition of the $a_2b_2$ counter at all times.

The carry from the $a_2$ counter is taken from the #3 tap of the T unit 80 and is connected through an I unit 89 to the #3 tap of a T unit 91. Similarly, the carry taken from the $a_1$ portion of the $a_1b_1$ counter via the line 63 connects through an I unit 92 to the #3 tap of the T unit 91. A line 93 from which $B_2$ pulses are taken connects through an I unit 94 to the #10 tap of the T unit 91 for resetting this trigger each $B_2$ time. (A $B_2$ pulse occurs during each character time, after the corresponding $B_r$ pulse.) Thus, the trigger 91 is normally in a condition wherein the #10 tap thereof is low; however, when there is either an $a_1$ or $a_2$ carry, this condition is momentarily reversed, thereby raising the potential of the #10 tap. The #10 tap of the trigger 91 connects through a K unit 101 to a line 102 for indicating an *ab* carry. This line operates the trigger 18 (FIG. 1), as will be explained.

Figure 6:
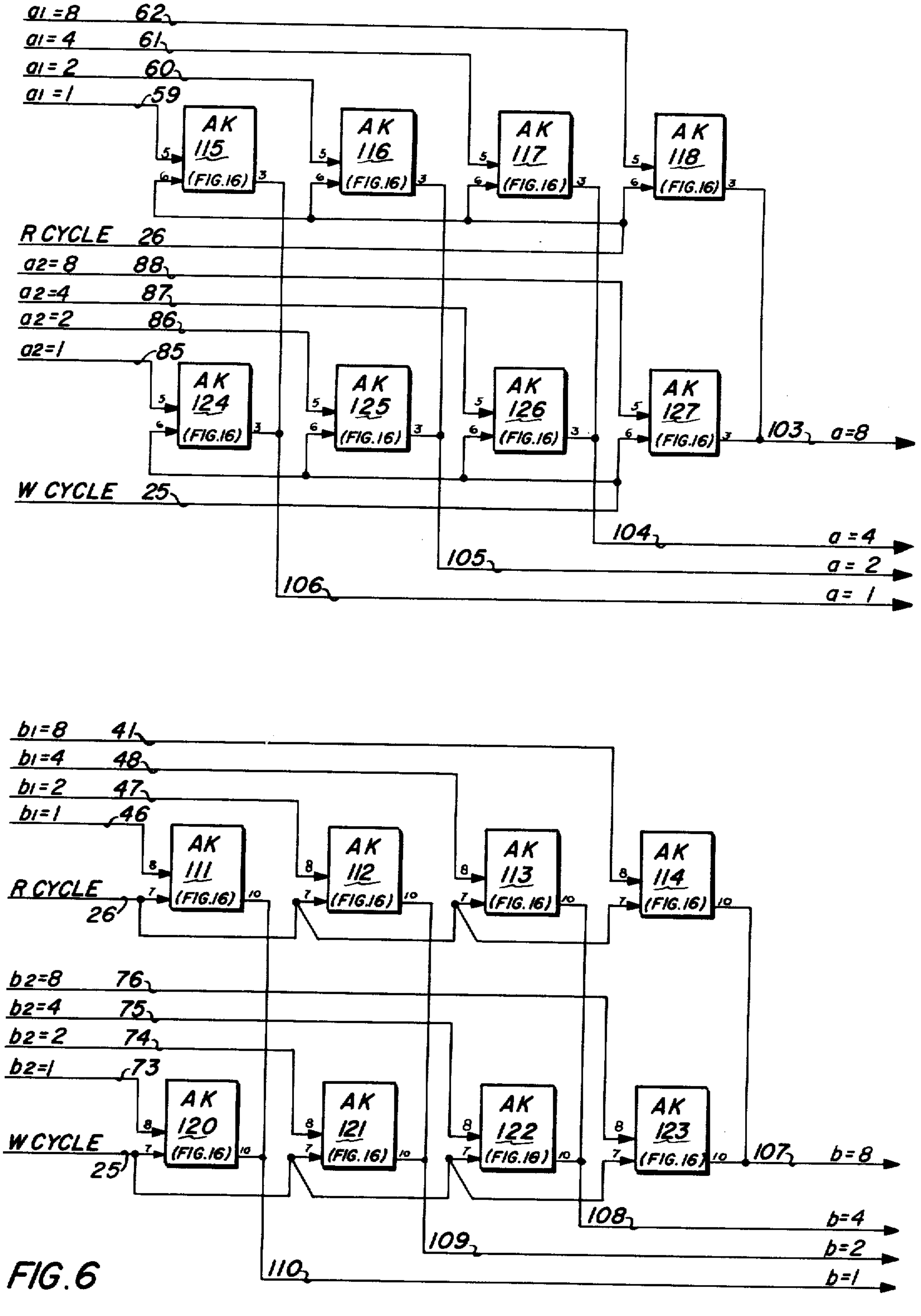

During the R cycle the contents of the $a_1b_1$ counter are continuously analyzed for controlling the condition of eight lines 103 through 110 (FIG. 6). Similarly, during the W cycle the condition of the $a_2b_2$ counter controls the condition of the lines 103 through 110. Referring to FIG. 6, it will be seen that the lines 46, 47, 48, 41, 59, 60, 61 and 62 connect to one input of a corresponding AK unit 111 through 118, the second input to each of these AK units being the R cycle line 26. The output of the AK units 111 through 118 connects to the corresponding line 110 through 103 as indicated in the drawing. In a similar manner, each of the lines 73 through 76 as well as the lines 85 through 88 connects to one input of a corresponding AK unit 120 through 127, the second input to the AK units 120 through 127 being the W cycle line 25. During the W cycle, therefore, the condition of the $a_2b_2$ counter determines the condition of the lines 103 through 110. Thus, during the R cycle whenever the #10 tap of the trigger 54 (FIG. 4) is high, for example, the line 103 will be high, thereby indicating the condition of that trigger. In a similar manner, the lines 104 through 110 indicate the conditions of the *a* and *b* portions of the $a_1b_1$ and $a_2b_2$ counters during the R and W cycles. These lines are entered into the *mn* comparator circuit for comparison with the contents of the *mn* register, as will be described.

Figure 7:
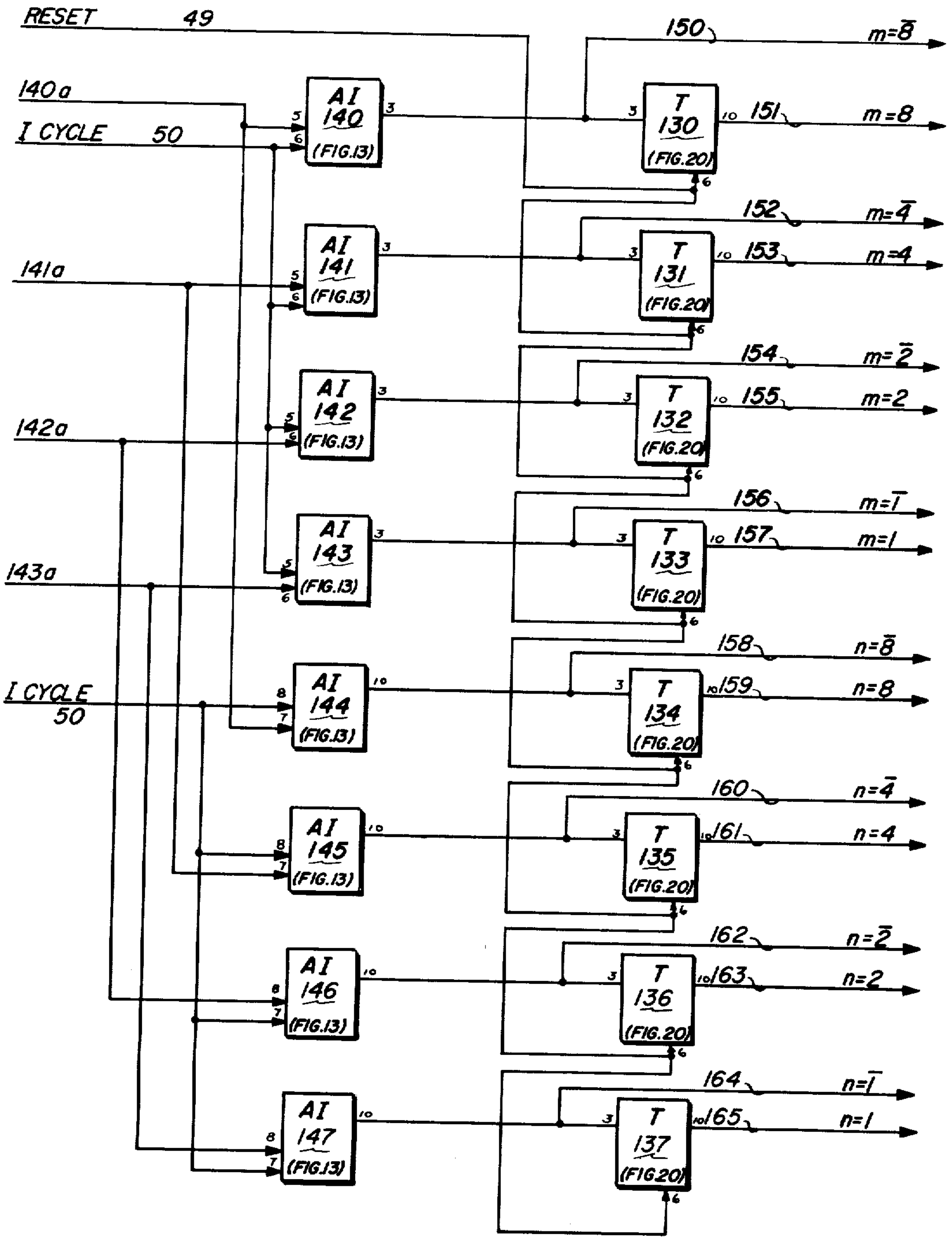
Figure 8:
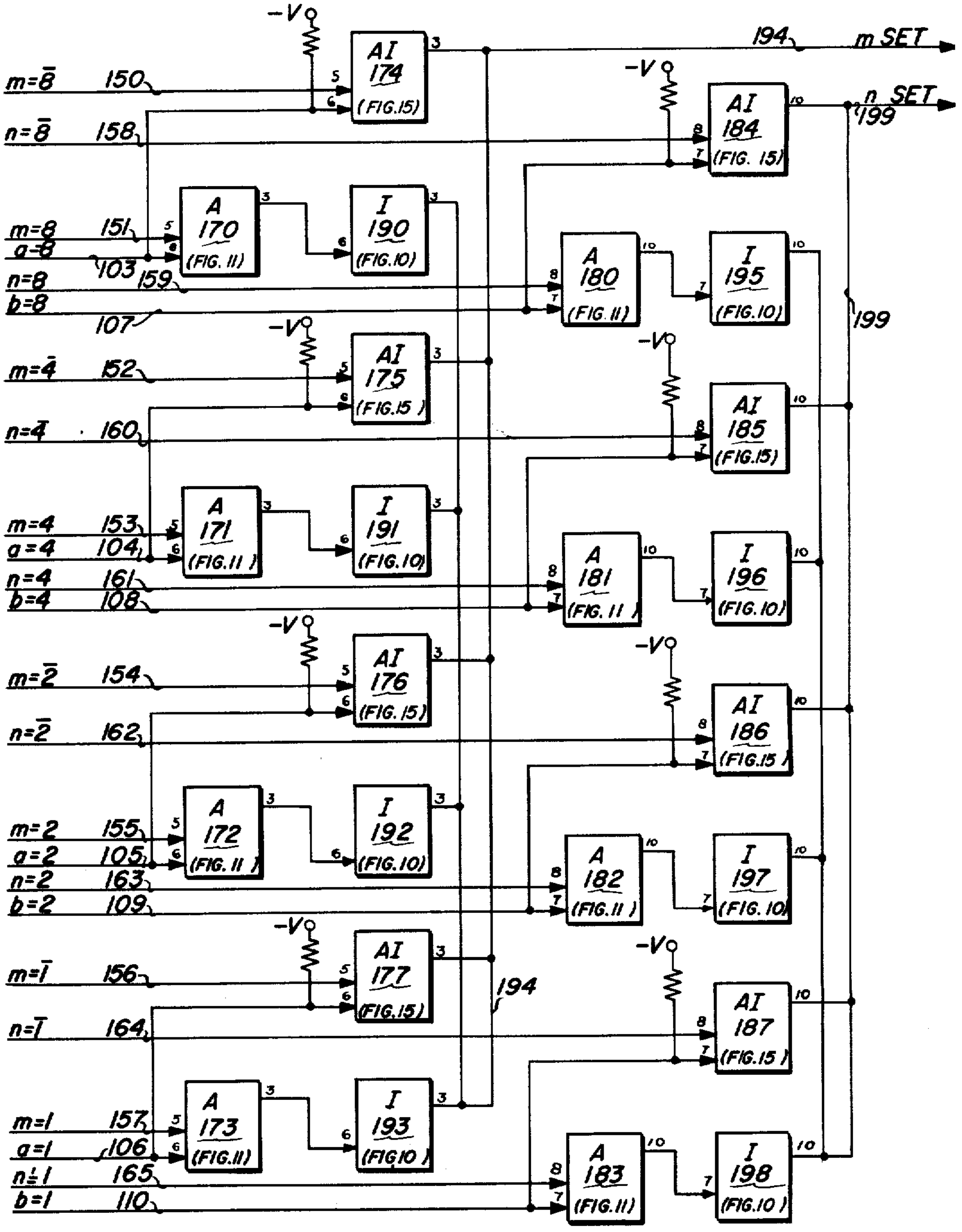

Before proceeding with the description of the *mn* comparison circuit, however, the *mn* register will be described. Referring now to FIG. 7, the *mn* register includes eight triggers 130 through 137, which triggers are reset prior to the instruction cycle by opening the bias line 49 connected to each of the #6 taps thereof, these triggers being reset in such a way that the #10 taps thereof are low. The triggers 130 through 133 are concerned with the *m* portion of the instruction, the triggers 134 through 137 being associated with the *n* portion thereof. The *mn* data is entered into the triggers 130 through 137 through a corresponding AI unit 140 through 147 during the I cycle, the *mn* data being entered via four lines **140*a* through 143*a***.

Each of the triggers 130 through 137 has two output lines associated therewith, these lines being labeled 150 through 165. The trigger 130 is arranged to indicate whether or not *m* equals 8. If, for example, *m* equals 8, the trigger is set in a condition wherein the #10 tap thereof is high, the #3 tap being low, thereby raising the potential of the line 151 and lowering the potential of the line 150. The triggers 131 through 137 similarly control the condition of the lines 152 through 165 associated therewith.

The *m* lines 151, 153, 155 and 157 connect to the #5 tap of a corresponding A unit 170 through 173 (FIG. 8), the #6 taps of these units being connected to a line 103 through 106, respectively. Additionally, the $\overline{m}$ lines 150, 152, 154 and 156 connect to the #5 tap of a corresponding AI unit 174 through 177, the #6 taps of these units being additionally connected to a line 103 through 106. In a similar manner, the *n* lines 159, 161, 163 and 165 connect to the #8 tap of a corresponding A unit 180 through 183, the $\overline{n}$ lines 158, 160, 162 and 164 being connected to the #8 taps of corresponding AI units 184 through 187. The #7 taps of the units 180 through 187 connect, as shown in the drawing, to the *b* lines 107 through 110. The output of each of the A units 170 through 173 connects via a corresponding I unit 190 through 193 to a line 194, which line also connects to the output of each of the AI units 174 through 177. The output of each of the A units 180 through 183 connects via a corresponding I unit 195 through 198 to a line 199, the line 199 also connecting to the output of each of the AI units 184 through 187.

The AI units 174 through 177, together with the A units 170 through 173, comprise a multi-input "and" circuit wherein the line 194 can rise in potential only when the condition of the $a_1$ or $a_2$ counter corresponds to the condition of the *mn* register. In a similar manner, the line 199 rises only when the $b_1$ or $b_2$ counter corresponds to the condition of the *mn* register. Thus, for example, if *mn* equals 80, i.e., if the line 151 is high, the line 150 is low, and the lines 158, 152, 160, 154, 162, 156 and 164 are high, it will be seen that when the lines 103 through 106 and 107 through 110 are in a condition wherein the lines 103 is high and the lines 104 through 110 are low, both of the lines 194 and 199 are high. Thus, it is not until the condition of either the $a_1b_1$ or $a_2b_2$ counter corresponds to the condition of the *mn* register that the lines 194 and 199 are simultaneously high.

Figure 9:
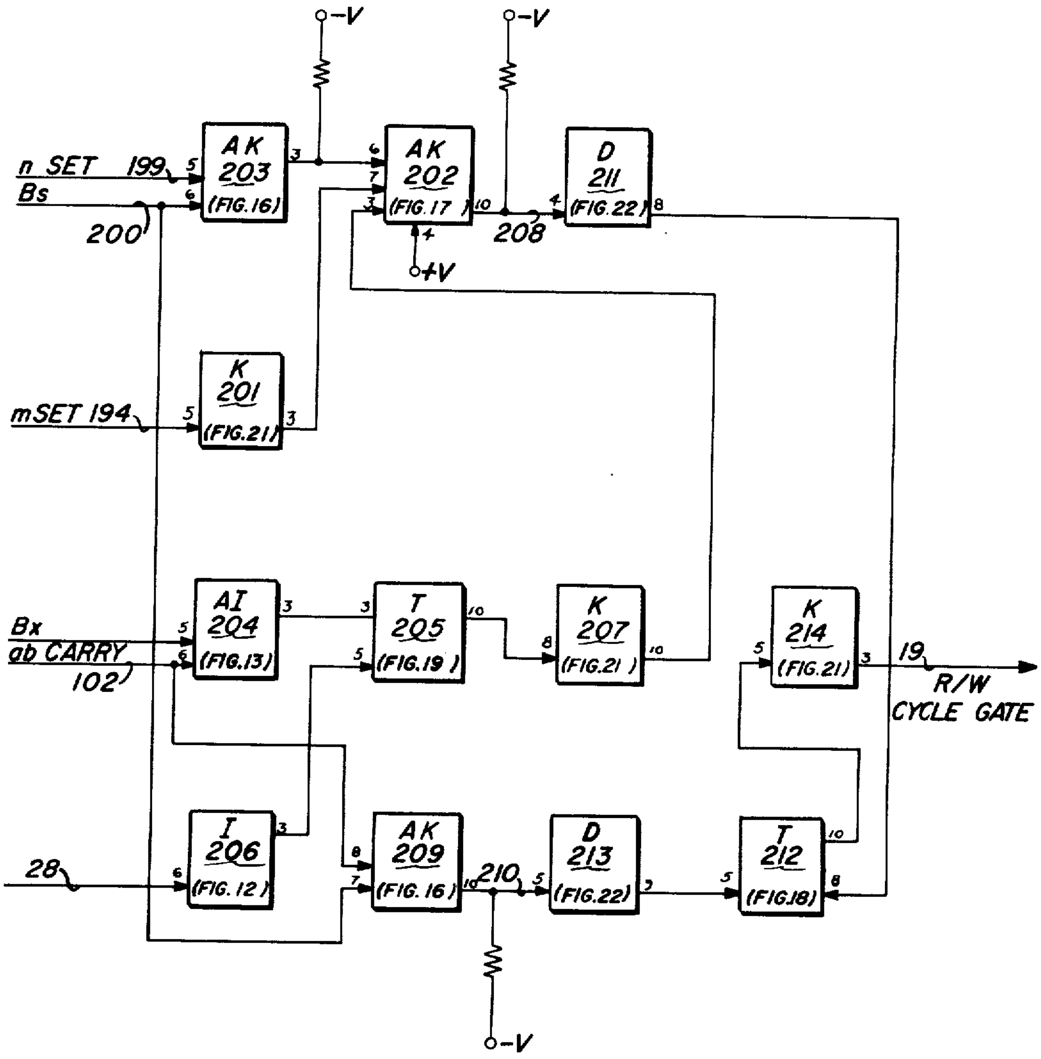
Figure 10:
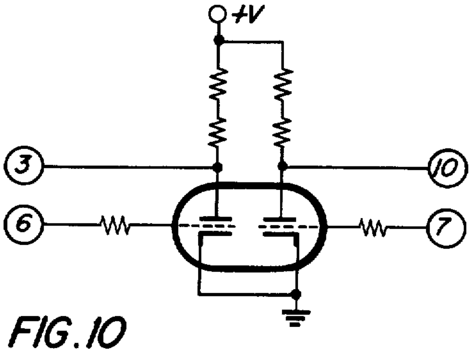
Figure 11:
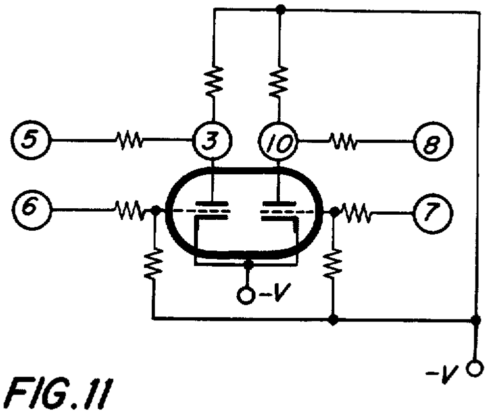
Figure 12:
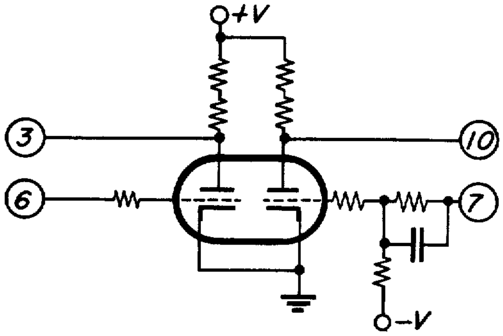

The lines 194 and 199, termed the "*m* set" and "*n* set" lines, respectively, are utilized to control the generation of a signal referred to as the "*mn* compare signal." Referring to FIG. 9, it will be seen that the line 194 connects through a K unit 201 to the #7 tap of an AK unit 202. Additionally, the *n* set line 199 connects to the #5 tap of an AK unit 203, and #6 tap of which connects to a line 200 from which $B_s$ pulses are taken. Thus, the *n* set signal is mixed with $B_s$ pulses and the resultant signal connects to the #6 tap of the AK unit 202. The #3 tap of the unit 202 is controlled to go up after there is a carry from the $a_1b_1$ or $a_2b_2$ counter to prevent an erroneous comparison prior to the *ab* carry signal. This is true since the *ab* carry line 102 taken from the #10 tap of the K unit 101 (FIG. 5) connects to the #6 tap of an AI unit 204, the #5 tap of which connects to the $B_x$ line. Thus, when the line 102 rises, the next following $B_x$ pulse causes the #3 tap of the unit 204 to drop. This tap connects to the #3 tap of a T unit 205 and operates this unit to raise the potential of the #10 tap thereof. The #10 tap of the unit 205 connects through a K unit 207 to the #3 tap of the unit 202. Thus, if there has been an *ab* compare signal, the *mn* compare line 208 connected to the #10 tap of the unit 202 rises during $B_s$ time when both of the lines 194 and 199 are high. It should additionally be noted that the *ab* carry line 102 connects to the #8 tap of an AK unit 209, the #7 tap of which connects to the $B_s$ line 200 mentioned above. Thus, the *ab* carry signal is mixed with $B_s$ pulses in the unit 209 and the resulting signal is entered on a line 210 connected to the #10 tap of the unit 209. The line 210 is referred to herein as the "*ab* compare line."

The *mn* compare line 208 connects through a diode 211 to the #8 tap of a T unit 212. Similarly, the *ab* compare line 210 connects through a diode 213 to the #5 tap of the unit 212. The #10 tap of the trigger 212 connects through a K unit 214 to the R/W gate line 19. When there is an *ab* compare signal, the trigger 212 is operated to raise the potential of the #10 tap thereof, thereby controlling the line 19 to go up, and it is not until the *mn* comparison signal that this condition reverses since the #8 tap of the trigger 212 rises at that time for controlling the condition of the trigger 212 to be reversed. Thus, when there is an *mn* compare signal, the line 19 drops, thereby terminating the R/W cycle gate.

It should now be clear that the 99's complement of the address of the initial character position concerned with the data transfer operation is entered into either the $a_1b_1$ or $a_2b_2$ counter according to whether the operation is a read or record operation. When that counter carries, the *ab* compare signal is generated for initiating the R/W cycle gate at the beginning of the character time of the desired character position. The number of character positions involved in the transfer operation is similarly entered into the *mn* register for comparison with the counter involved. It is not until the condition of the counter is identical with the condition of the register that the R/W cycle gate is terminated. This controls the transfer of data associated with the desired character positions.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Apparatus for controlling data transfer to or from selected storage positions of a predetermined number of serially scanned data storage positions which are addressed according to their location in the sequence of storage positions, comprising:
a counter,
means for setting said counter in an initial condition according to the address of an initial storage position,
said counter being arranged to count scanned storage positions for altering the condition thereof from said initial condition,
means responsive to a carry signal from said counter for initiating a data transfer gate,
said means being responsive to a second condition of said counter wherein said counter indicates the number of storage positions involved in a transfer operation for terminating said transfer gate, and
means for generating said carry signal when a number of storage positions have been scanned equal to said initial address less one.

2. Apparatus for controlling data transfer to or from selected storage positions of a predetermined number N of serially scanned data storage positions which are addressed according to their location in the scanning sequence, comprising:
a counter settable according to the N's complement of the address of an initial storage position and arranged to count scanned storage positions,
means responsive to a carry signal developed by said counter for initiating a data transfer gate,
register means for indicating the number of data storage positions involved in a transfer operation, and
means for comparing the condition of said counter and the condition of said register,
said comparing means being responsive to a comparison between said counter and said register for terminating said data transfer gate.

3. Apparatus for controlling data transfer to or from selected storage positions of a plurality of serially scanned, cyclically available data storage positions, comprising:
a ring counter having a range corresponding to the number N of said data storage positions and settable according to the N's complement of the location in said sequence of the initial storage position involved in a data transfer operation,
said counter being arranged to count scanned storage positions starting with the first of said positions scanned during each cycle,
a bistable device arranged for generating a data transfer gate,
said device being responsive to a carry signal generated by said counting means for initiating said transfer gate,
means for indicating the number of storage positions involved in the data transfer operation,
means for determining a correlation between said counting means and said indicating means, and
means responsive to a predetermined correlation between said counting means and said indicating means for operating said bistable device to terminate said transfer gate,
whereby said transfer gate is initiated according to the initial storage position involved in the transfer operation and is terminated after the number of storage positions involved in the operation have been scanned.

4. Apparatus for controlling data transfer from selected storage positions of a first medium to selected storage positions of a second medium, wherein a plurality of said storage positions of said media are scanned serially and are addressed according to their location in the scanning sequence, comprising:
a first counting means settable according to the address of the initial storage position of said first medium involved in a transfer operation and operable in response to scanned storage positions during a first period,
a second counting means settable according to the initial storage position of said second medium involved in said transfer operation and operable in response to scanned storage positions during a second period,
means for generating a gating signal for controlling the selection of storage positions in said first and second media,
said means being responsive to a first predetermined condition of said first counting means which indicates that the non-selected storage positions preceding said selected storage positions of said first medium have been scanned for initiating said gating signal during said first period, and
being additionally responsive to a first predetermined condition of said second counting means which indicates that the non-selected storage positions preceding said selected storage positions of said second medium have been scanned for initiating said gating signal during said second period, and
means responsive to a second predetermined condition of said first counting means corresponding to the number of storage positions involved in the transfer operation for terminating said gating signal during said first period,
said means being additionally responsive to a second predetermined condition of said second counting means which corresponds to the number of storage positions involved in the transfer operation for terminating said gating signal during said second period.

5. Apparatus for controlling data transfer from selected storage positions of a first medium during a first period to selected storage positions of a second medium during a second period, wherein said storage positions are scanned serially during said first and second periods and are identified by their location in the scanning sequence, comprising:
a first counting means having a range corresponding to the number of storage positions of said first medium and settable according to a complement of the identity of the initial storage position of said first medium involved in a transfer operation,
a second counting means having a range corresponding to the number of storage positions of said second medium and settable according to a complement of the identity of the initial storage position of said second medium involved in said transfer operation,
means for operating said first and second counting means during said first and second periods, respectively, according to scanned storage positions,
a gate generating circuit responsive to a carry signal from said first and second counting means during said first and second periods, respectively, for initiating a transfer gate,
means for indicating the number of storage positions involved in a transfer operation, and
means for comparing said first and second counting means with said indicating means during said first and second periods, respectively,
said means being arranged to control said gate generating circuit to terminate said transfer gate in response to a comparison between said indicating means and said first or second counting means during the corresponding first or second period, respectively.

6. Apparatus for controlling data transfer from selected storage positions of a first medium to selected storage positions of a second medium, wherein said storage positions are scanned serially, comprising:

a first means for counting storage positions of said first medium, a second means for counting storage positions of said second medium, means for setting said first counting means according to location in the sequence of the initial storage position of said first medium involved in a transfer operation and for operating it during a first period to count scanned storage positions of said first medium, means for setting said second counting means according to the location in the sequence of the initial storage position of said second medium involved in said transfer operation and for operating it during a second period to count scanned storage positions of said second medium, means for indicating the number of storage positions involved in the transfer operation, means for initiating a gating signal during said first period in response to a predetermined condition of said first counting means which indicates that said initial storage position of said first medium is about to be scanned, said means being arranged to initiate a gating signal during said second period in response to a predetermined condition of said second counting means which indicates that said initial storage position of said second medium is about to be scanned, and means for terminating said gating signal during said first period in response to a predetermined correlation between said first counting means and said indicating means, said means being adapted to terminate said gating signal during said second period in response to a predetermined correlation between said second counting means and said indicating means, whereby gating signals are generated according to selected storage positions involved in a data transfer operation.

7. Apparatus for controlling data transfer from selected storage positions of a first medium having N storage positions to selected storage positions of a second medium having N storage positions, wherein said storage positions are serially scanned and are addressed according to their location in the scanning sequence, comprising:

a first counting means settable according to the N's complement of the address of the initial storage position of said first medium involved in a transfer operation, a second counting means settable according to the N's complement of the address of the initial storage position of said second medium involved in said transfer operation, means for indicating scanned storage positions, said means being arranged to operate said first counting means during a first period and to operate said second counting means during a second period, registering means for indicating the number of storage positions involved in the transfer operation, means for determining a correlation between said first counting means and said registering means during said first period, means for determining a correlation between said second counting means and said registering means during said second period, means responsive to a carry signal generated by said first counting means during said first period for initiating a read gate, means responsive to a predetermined correlation between said first counting means and said registering means during said first period for terminating said read gate, means responsive to a carry signal generated by said second counting means during said second period for initiating a write gate, and means responsive to a predetermined correlation between said second counting means and said registering means during said second period for terminating said write gate.

References Cited in the file of this patent

UNITED STATES PATENTS

| | | |
|---|---|---|
| 2,540,654 | Cohen | Feb. 6, 1951 |
| 2,679,638 | Bensky | May 25, 1954 |
| 2,721,990 | McNaney | Oct. 25, 1955 |
| 2,912,672 | Loper | Nov. 10, 1959 |
| 2,912,673 | Groenendyke | Nov. 10, 1959 |
| 2,950,459 | Loper et al. | Aug. 23, 1960 |

FOREIGN PATENTS

| | | |
|---|---|---|
| 202,162 | Australia | June 13, 1956 |

OTHER REFERENCES

Publication I: Richards, "Arithmetic Operations in Digital Computers," copyright 1955, D. Van Nostrand Co., Inc., Princeton, New Jersey, pages 81 to 113, 179–181, 205–208, and 245–246.